W. B. JARVIS.
Animal-Trap.
No. 87,173.
Patented Feb. 23, 1869.
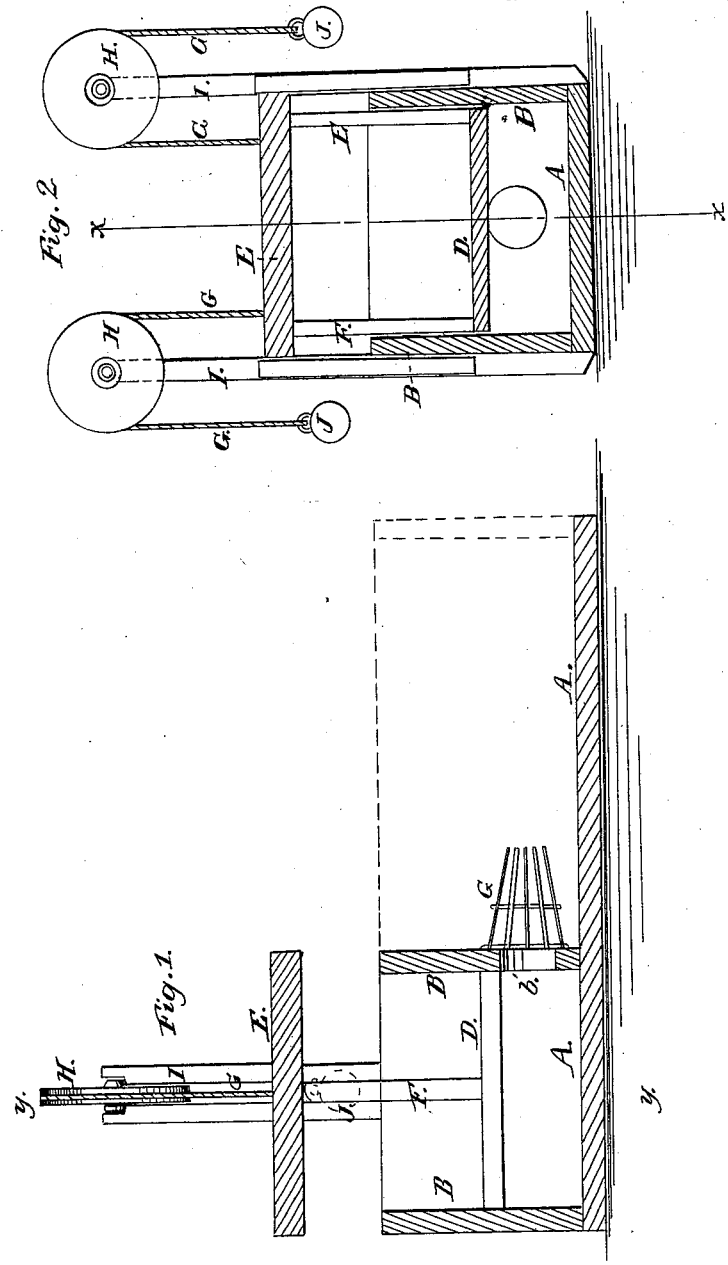
Witnesses:
Inventor:
W. Bronson Jarvis

United States Patent Office.

W. BRONSON JARVIS, OF WASHINGTON, NORTH CAROLINA.

Letters Patent No. 87,173, dated February 23, 1869.

IMPROVED ANIMAL-TRAP.

The Schedule referred to in these Letters Patent and making part of the same.

*To all whom it may concern:*

Be it known that I, W. BRONSON JARVIS, of Washington, in the county of Beaufort, and State of North Carolina, have invented a new and improved Animal-Trap; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved trap, taken through the line x x, fig. 2.

Figure 2 is a vertical cross-section of the same, taken through the line y y, fig. 1.

Similar letters of reference indicate corresponding parts.

My invention has for its object to furnish a simple, convenient, reliable, and self-setting animal-trap, which shall be so constructed and arranged as to be not at all liable to get out of order; and It consists in the construction and combination of the various parts of the trap, as hereinafter more fully described.

A is the bottom or base-board of the trap, upon one end of which should be formed, or to it should be attached a cage or compartment, covered with or formed wholly of wire, as shown in red in fig. 1.

Upon the other end of the board A, is formed a close compartment, B, of any desired form or size, according to the size and character of the animal trapped for.

A hole, b', of sufficient size to allow the animal to pass through, should be formed in the lower part of the side or partition of the box or compartment B, leading into the cage, upon the other end of the board A.

The hole b', upon the outer side of the box B, may be provided with a wire or other guard, C, so constructed as to allow the animal to pass out freely, but which will wholly prevent his return.

D is a false bottom, fitting accurately but loosely into the box or compartment B, and which is rigidly connected with the cover E by connecting-bars F, so that the said false bottom D and cover E may move up and down together.

To the cover E are attached the ends of the cords G, which pass over pulleys H, pivoted to supports I, attached to the sides of the box B.

To the other ends of the cords G, are attached weights J, so adjusted as to exactly balance the false bottom D and cover E, when said false bottom D may be about three inches, more or less, according to the size of the animal trapped for, above the bottom board A, the cover E being, at the same time, the same distance above the upper edge of the box B.

In using the trap, the bait is placed upon the middle part of the false bottom D, and when the animal jumps in to get it, the said false bottom sinks below the hole b', and at the same time the cover E closes down closely upon the top of the box B.

The frightened animal, seeking to escape, rushes through the hole b', and is safely caged. The false bottom D and cover E being relieved from the weight of the animal, immediately rise to their former positions, and the trap is set for the next animal.

Having thus described my invention,

I claim as new, and desire to secure by Letters Patent—

The combination and arrangement of the false bottom D, cover E, cords G, pulleys H, and weights J, with each other, and with the trap A B, whether the hole b' be made with or without the guard C, substantially as herein shown and described, and for the purpose set forth.

W. BRONSON JARVIS.

Witnesses:
JNO. G. BLOUNT,
EDMD. S. HOYT.